(12) United States Patent
Yu et al.

(10) Patent No.: US 9,780,943 B2
(45) Date of Patent: Oct. 3, 2017

(54) BROADBAND DISTRIBUTED AMPLIFIER BASED ACTIVE DUPLEXER

(71) Applicants: Mark K. Yu, Ellicott City, MD (US); Ronald G. Freitag, Catonsville, MD (US)

(72) Inventors: Mark K. Yu, Ellicott City, MD (US); Ronald G. Freitag, Catonsville, MD (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 152 days.

(21) Appl. No.: 14/941,179

(22) Filed: Nov. 13, 2015

(65) Prior Publication Data

US 2017/0141909 A1    May 18, 2017

(51) Int. Cl.
*H04L 12/50* (2006.01)
*H04L 5/14* (2006.01)

(52) U.S. Cl.
CPC .................................. *H04L 5/1461* (2013.01)

(58) Field of Classification Search
CPC ........................................................ H04L 5/00
USPC ........................................................ 370/282
See application file for complete search history.

(56) References Cited

U.S. PATENT DOCUMENTS

| | | | |
|---|---|---|---|
| 5,027,084 A | 6/1991 | Tsukii | |
| 5,105,166 A | 4/1992 | Tsukii et al. | |
| 6,768,380 B2 | 7/2004 | Hong et al. | |
| 7,239,852 B2 | 7/2007 | Yang et al. | |
| 7,460,662 B2 | 12/2008 | Pagnanelli | |
| 7,555,219 B2 | 6/2009 | Cox et al. | |
| 2015/0255994 A1* | 9/2015 | Kesler | H02J 5/005 307/10.1 |

OTHER PUBLICATIONS

El-Khatib, Ziad, Leonard MacEachern, and Samy Mahmoud. "Fully-integrated CMOS bidirectional distributed amplifier as tunable active duplexer for wireless transceiver applications." *Microsystems and Nanoelectronics Research Conference*, 2008. MNRC 2008. 1st. IEEE, 2008.

(Continued)

*Primary Examiner* — Dang Ton
(74) *Attorney, Agent, or Firm* — Tarolli, Sundheim, Covell & Tummino LLP

(57) ABSTRACT

A system includes a transmitter to drive a transmission signal via a first and second transmission line. One half of the transmission signal is applied to the first transmission line and the other half of the transmission signal is applied to the second transmission line. An antenna radiates the transmission signal from the transmitter and receives a reception signal. The reception signal is driven in the opposite direction of the transmission signal on the first and second transmission lines. A plurality of differential amplifiers receive the reception signal from different sections of the first and second transmission lines and generate amplified output signals to a receiver output path having a first and second receiver transmission line. The differential amplifiers reject the one half of the transmission signal applied to the first transmission line and the other half of the transmission signal applied to the second transmission line.

20 Claims, 6 Drawing Sheets

(56) References Cited

OTHER PUBLICATIONS

Leisten, O. P., R. J. Collier, and R. N. Bates. "Distributed amplifiers as duplexer/low crosstalk bidirectional elements in S-band." *Electronics Letters* 24.5 (1988): 264-265.
Qin, Shihan, and Yuanxun E. Wang. "Parametric conversion with distributedly modulated capacitors (DMC) for low-noise and non-reciprocal RF front-ends." *Microwave Symposium Digest (IMS), 2013 IEEE MTT-S International*. IEEE. 2013.

* cited by examiner

BROADBAND DISTRIBUTED AMPLIFIER BASED ACTIVE DUPLEXER

TECHNICAL FIELD

This disclosure relates to amplifier circuits, and more particularly to a distributed amplifier circuit that supports concurrent full duplex operations via in-circuit active isolation between transmitter and receiver.

BACKGROUND

In telecommunications, broadband is a wide bandwidth data transmission with an ability to simultaneously transport multiple signals and traffic types. The transmission medium can be coaxial cable, optical fiber, radio, twisted pair, and so forth. A broadband signaling method is one that accommodates a wide band of frequencies where the term broadband is a relative term, understood according to its context. The wider (or broader) the bandwidth of a channel, the greater the information-carrying capacity, given the same channel quality. In designing systems to process broadband signals, it is desirable to provide full-duplex operations where both broadband transmissions and broadband reception of signals can occur concurrently without interference between transmission and reception. In many cases, separate receiving and transmit antennas are provided where separate channels are operated to alleviate interference between channels. If a single antenna is employed for such purposes however, then circuits need to be implemented to isolate transmission signals sent to the antenna from reception signals that are also received at the antenna. Many prior attempts at isolating transmitter and receiver signals have employed passive filter circuits. Such circuits have a limited bandwidth performance in their ability to fully isolate transmitter and receiver signals however.

SUMMARY

This disclosure relates to a distributed amplifier circuit and system that supports concurrent full duplex operations via in-circuit active isolation between transmitter and receiver. In one aspect, a system includes a transmitter to drive a transmission signal via a first and second transmission line. One half of the transmission signal is applied to the first transmission line and the other half of the transmission signal is applied to the second transmission line. An antenna radiates the transmission signal from the transmitter and receives a reception signal. The reception signal is driven in the opposite direction of the transmission signal on the first and second transmission lines. A plurality of differential amplifiers receive the reception signal from different sections of the first and second transmission lines and generate amplified output signals to a receiver output path having a first and second receiver transmission line. The differential amplifiers reject the one half of the transmission signal applied to the first transmission line and the other half of the transmission signal applied to the second transmission line as a common mode signal to mitigate transmission signal interference with the reception signal.

In another aspect, a circuit includes a transmitter to drive a transmission signal via a first and second transmission line. One half of the transmission signal is applied to the first transmission line and the other half of the transmission signal is applied to the second transmission line. An antenna radiates the transmission signal from the transmitter and receives a reception signal. The reception signal is driven in the opposite direction of the transmission signal on the first and second transmission lines. The transmission signal and the reception signal are generated out of phase with respect to each other by about one hundred and eighty degrees. A plurality of differential amplifiers receive the reception signal from different sections of the first and second transmission lines and generate amplified output signals to a receiver output path having a first and second receiver transmission line. The differential amplifiers reject the one half of the transmission signal applied to the first transmission line and the other half of the transmission signal applied to the second transmission line as a common mode signal to mitigate transmission signal interference with the reception signal. A receiver processes the amplified output signals from the first and second transmission lines of the receiver output path.

In yet another aspect, a method includes applying a transmission signal via a first and second transmission line. One half of the transmission signal is applied to the first transmission line and the other half of the transmission signal is applied to the second transmission line. The method includes receiving a reception signal that is driven in the opposite direction of the transmission signal on the first and second transmission lines. This includes amplifying the reception signal from different sections of the first and second transmission lines to generate amplified output signals to a receiver output path having a first and second receiver transmission line. The method includes rejecting the one half of the transmission signal applied to the first transmission line and the other half of the transmission signal applied to the second transmission line as a common mode signal to mitigate transmission signal interference with the reception signal.

DETAILED DESCRIPTION

Figure 1:
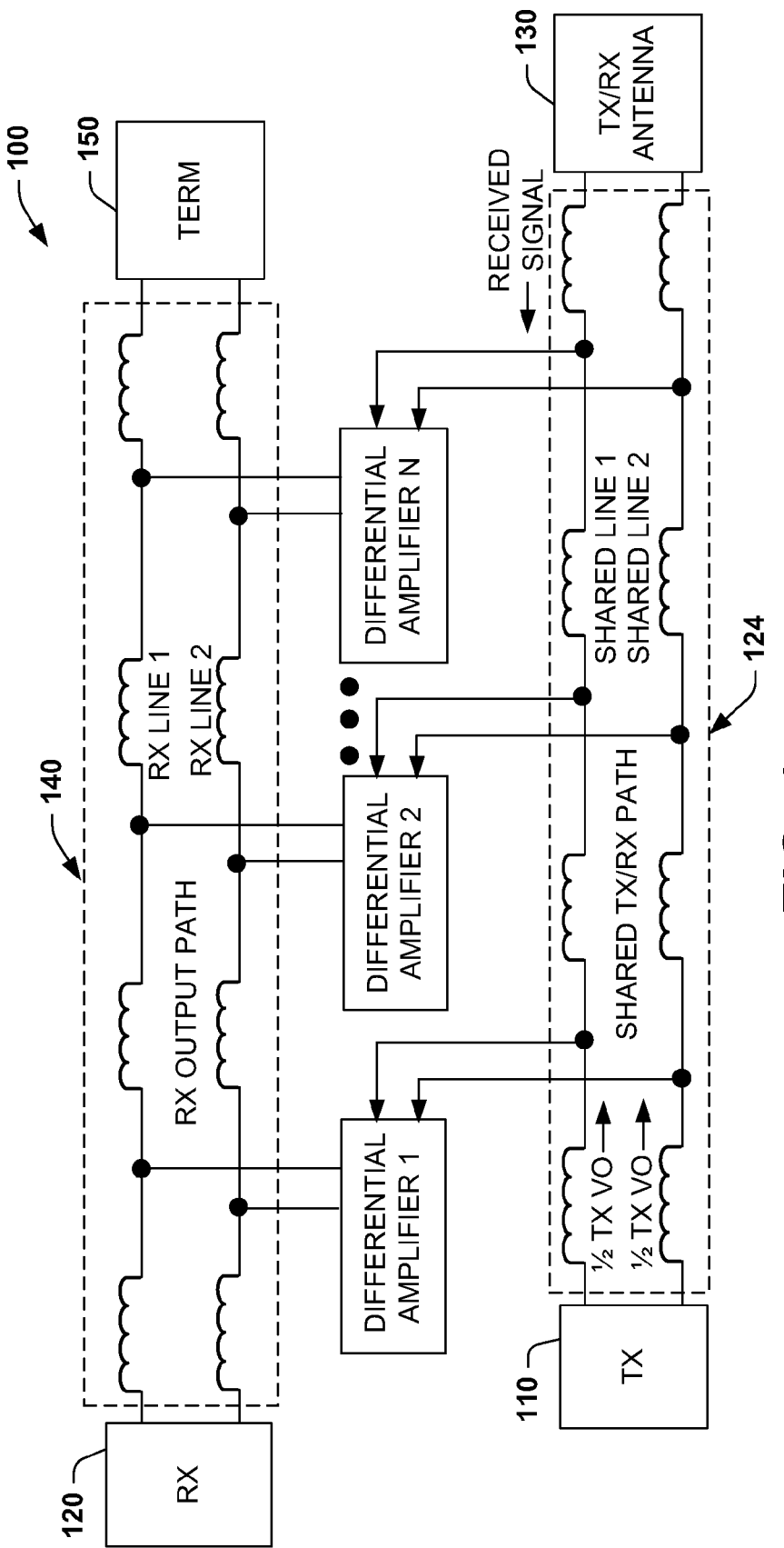
FIG. 1 illustrates an example of a system that provides concurrent full duplex operations via in-circuit active isolation between a transmitter and a receiver.

This disclosure relates to a distributed amplifier circuit and system that supports concurrent full duplex operations via in-circuit active isolation between transmitter and receiver. The circuit can be operated as a radio-frequency (RF) front-end system that can be employed between a transmitter and an antenna (e.g., a single-channel antenna). The system is capable of full duplex operation and enables the transmitter to send a transmission (Tx) signal via the antenna to external devices while concurrently receiving a reception (Rx) signal at the antenna from the external devices. The system includes a pair of transmission lines (T1 and T2) for receiving half-power versions (in phase) of the Tx signal (½ the Tx signal) from a power splitter of the transmitter.

Each of the pair of transmission lines includes a set of transmission couplers (e.g., transmission line components such as inductors), and each transmission coupler of the given transmission line is associated with a transmission coupler of the other transmission line to form transmission-coupler (T-C) pairs. The system further includes a pair of reception lines (R1 and R2). Each receiving coupler of a given reception line is associated with a coupler of the other transmission line to form receiving-coupler (R-C) pairs. The system further includes a plurality of differential circuits forming a broadband distributed amplifier comprising respective differential inputs and outputs. The differential inputs are connected to respective T-C pairs and the differential outputs are connected to respective R-C pairs. The differential circuits are configured to reject signals that are common to respective differential inputs and amplify differences between the respective differential inputs.

During transmission, ½Tx signals propagate along T1 and T2 to the antenna and a terminating resistor. A portion of the ½Tx signal along T1 and T2 is supplied via the T-C pairs to corresponding differential pairs. However, since the corresponding differential circuits are configured to reject signals that are common to respective differential inputs, the portion of the ½Tx signal received at each differential circuit is rejected and not amplified. During reception, the antenna generates the Rx signal. The Rx signal is propagated along T1 toward the transmitter and in the opposite direction from the Tx signal.

As the Rx signal is propagating along T1, a portion of the Rx signal is supplied at each T-C of the T-C pairs along T1 to a respective differential input of the differential circuits. Concurrently, a virtual ground signal at T2 is induced via the other T-C of the T-C pairs along T2 to the other differential input of the differential circuits. Each differential circuit thus amplifies the difference between the virtual ground signal and a corresponding portion of the Rx signal and generates a portion of an amplified differential Rx signal at the respective R-C pairs that are in phase with respect to one another. Portions of the differential Rx signal received at each respective R-C pair is summed to provide the differential Rx signal to the receiver.

By transmitting the TX signals as a common mode signal, transmitter signal interference with the receiver is rejected by the active common mode rejection capability of the differential amplifier circuits. Moreover, the Tx transmitted and Rx reception signals can be phased at one hundred and eighty degrees out of phase with respect to each other (e.g., one even mode phasing and one odd mode phasing) to further reduce interactions between Tx and Rx signals. Also, local oscillator signals can be mixed with the amplified received signals to provide up and/or down conversion capability for the received signal at the receiver.

FIG. 1 illustrates an example of a system 100 that provides concurrent full duplex operations via in-circuit active isolation between a transmitter 110 and a receiver 120. The transmitter 110 drives a transmission signal via a first and second transmission line shown as shared line 1 and shared line 2, respectively, and form a shared transmitter/receiver (TX/RX) signal path 124. One half of the transmission signal shown as ½ TX VO is applied to the first transmission line and the other half of the transmission signal is applied to the second transmission line. An antenna 130 radiates the transmission signal from the transmitter 110 and concurrently receives a reception signal shown as RECEIVED SIGNAL. The reception signal is driven in the opposite direction of the transmission signal on the first and second transmission lines in the TX/RX signal path 124.

A plurality of differential amplifiers shown as differential amplifier 1 through N, with N being a positive integer, receive the reception signal from different sections of the first and second transmission lines and generate amplified output signals to a receiver output path 140 having a first and second receiver transmission line shown as RX Line 1 and RX Line 2. Each of the paths 124 and 140 are shown having serial transmission line components (e.g., inductors) which can also be referred to as transmission line couplers representing the characteristic distributed impedance of a given transmission line. The differential amplifiers 1 through N reject the one half of the transmission signal applied to the first transmission line and the other half of the transmission signal applied to the second transmission line. The one half TX signal acts a common mode signal to the differential amplifiers and is rejected by the active common mode rejection capability of the respective amplifiers to mitigate transmission signal interference with the reception signal.

The transmission signal TX VO and the reception signal RECEIVED SIGNAL are generated out of phase with respect to each other by about one hundred and eighty degrees. This further reduces interaction between transmitted and received signals and operates to isolate the respective signals. At least one of the plurality of differential amplifiers 1 though N can include a phase adjustment capacitor at its output to adjust the phase of the reception signal (See e.g., FIG. 2). A termination block can be provided at 150. In one example, the termination block 150 serves as a transmission line impedance for the receiver output path 140. In another example, the termination block can be a local oscillator signal to provide mixing with the amplified output signals from the differential amplifiers 1-N. A switch can be provided (See E.g., FIG. 3) to apply a load impedance to the first and second receiver transmission lines RX Line1 and RX Line 2 via one switch setting or to apply a local oscillator signal to the first and second receiver transmission lines via another switch setting.

The local oscillator signal can be mixed with the amplified output signals on the first and second receiver transmission lines RX Line 1 and RX Line 2 to provide a down conversion signal that comprises the fundamental frequency of the reception signal minus the frequency of the local oscillator signal. In another example, the local oscillator signal can be mixed with the amplified output signals on the first and second receiver transmission lines to provide an up conversion signal that comprises the fundamental frequency of the reception signal plus the frequency of the local oscillator signal. The receiver 120 is at the end of the RX output path 140 and processes the amplified output signals from the first and second transmission lines RX Line 1 and RX Line 2 of the receiver output path. This can include further amplification and or digital conversion, for example.

Figure 4:
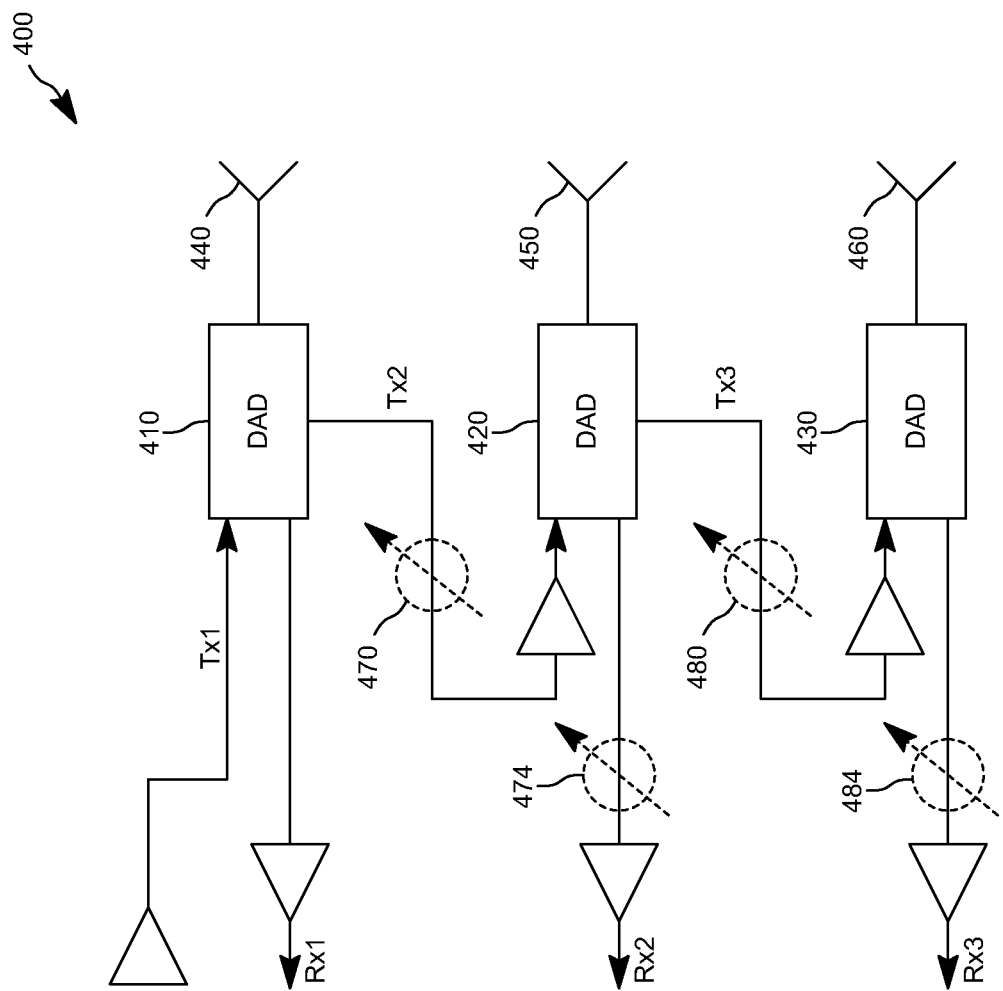
FIG. 4 illustrates an example a circuit having multiple distributed amplifier stages that provides concurrent full duplex operations via in-circuit active isolation between a transmitter and a receiver.

In other examples, the amplified output signals from the RX output path 140 can be provided to at least one other amplifier stage comprising a plurality of differential amplifiers that drive another antenna (See e.g., FIG. 4). A phase adjustment capacitor can be applied between stages to adjust the phase of the amplified output signals at the input to the other amplifier stage. Each additional stage can also include at least one other local oscillator signal to mix with the output of the other amplifier stage. The differential amplifiers 1 through N can be operational amplifiers having suitable gain for the reception signal and common mode rejection performance to reject the ½ TX VO signal.

Figure 2:
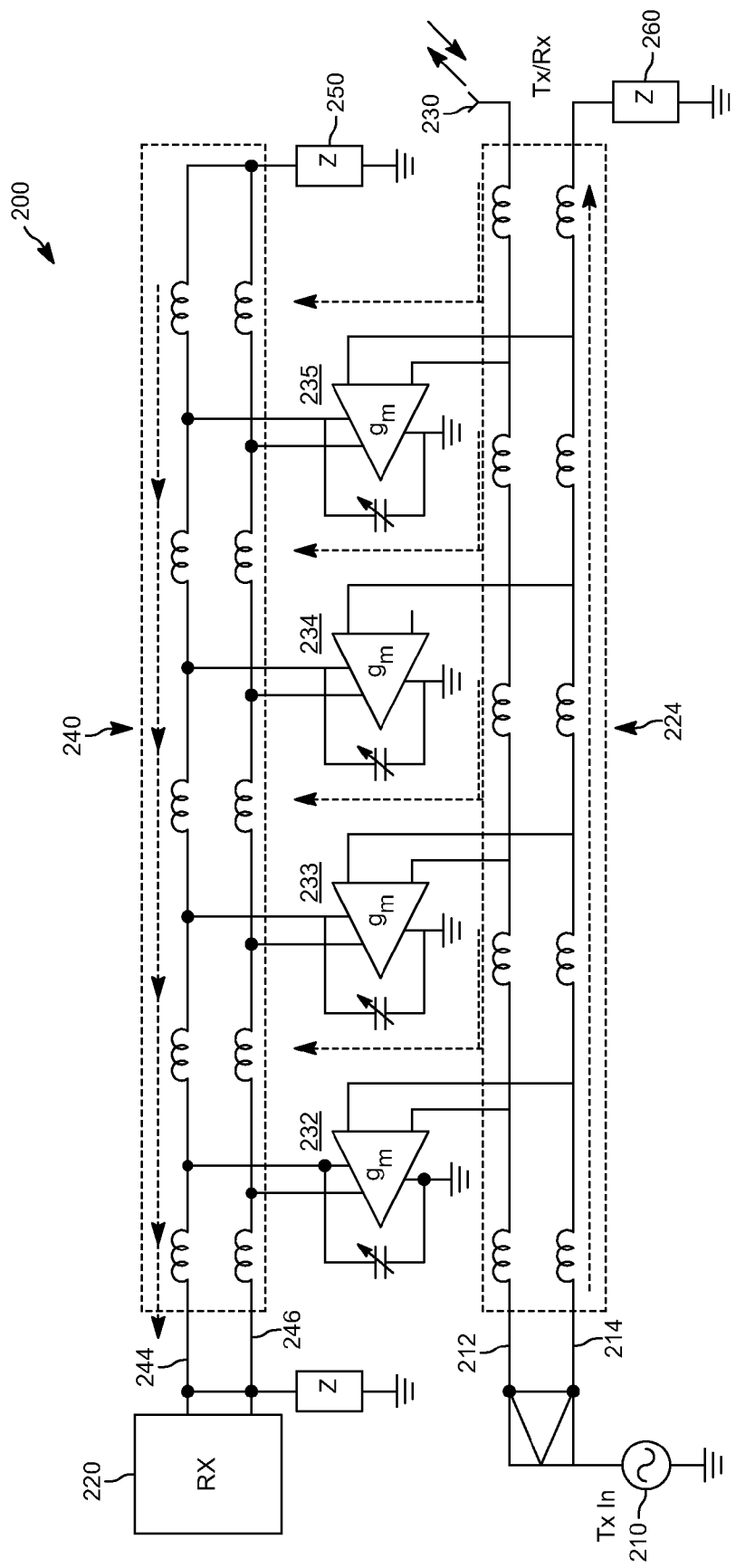
FIG. 2 illustrates an example a circuit that provides concurrent full duplex operations via in-circuit active isolation between a transmitter and a receiver.

FIG. 2 illustrates an example a circuit 200 that provides concurrent full duplex operations via in-circuit active isolation between a transmitter 210 and a receiver 220. The transmitter 210 drives a transmission signal via a first and second transmission line 212 and 214, respectively, and form a shared transmitter/receiver (TX/RX) signal path 124. One half of the transmission signal is applied to the first transmission line 212 and the other half of the transmission signal is applied to the second transmission line 214. An antenna 230 radiates the transmission signal from the transmitter 210 and concurrently receives a reception signal shown as right angle arrows up from the first transmission line 212. The reception signal is driven in the opposite direction of the transmission signal on the first and second transmission lines in the TX/RX signal path 224.

Four differential amplifiers 232 through 235 receive the reception signal from different sections of the first and second transmission lines 212 and 214 and generate amplified output signals to a receiver output path 240 having a first and second receiver transmission line shown at 244 and 246, respectively. Similar to FIG. 1 above, each of the paths 224 and 240 are shown having serial transmission line components (e.g., inductors) which can also be referred to as transmission line couplers representing the characteristic distributed impedance of a given transmission line. The differential amplifiers 232 through 235 reject the one half of the transmission signal applied to the first transmission line 212 and the other half of the transmission signal applied to the second transmission line 214. As noted previously, the one half TX signal acts a common mode signal to the differential amplifiers 232-235 and is rejected by the active common mode rejection capability of the respective amplifiers to mitigate transmission signal interference with the reception signal.

The transmission signal and the reception signal are generated out of phase with respect to each other by about one hundred and eighty degrees. This further reduces interaction between transmitted and received signals and operates to isolate the respective signals. As shown in this example, each of the differential amplifiers 232-235 can include a phase adjustment capacitor at its respective output to adjust the phase of the reception signal. A termination block can be provided at 250. In this example, the termination block 250 serves as a transmission line impedance for the receiver output path 240. Another termination block 260 can similarly be provided to terminate the second transmission line 214.

The termination block 260 terminates a point in the circuit 200 that represents a virtual ground. When two Rx signal inputs operate differentially, the common node behaves like a virtual ground so that both sides of the virtual ground are similar to mirrored amplifiers operating at 180 degrees out of phase. When there is only one single input (Rx+ reception from a single antenna for example), a mirrored signal Rx− is induced (mirrored image) because of the virtual ground and thus forms a differential pair in the output of each amplifier 232 through 235. The final receiver outputs are the results of these individual differential pairs added in-phase.

Existing systems have limited frequency performance due to on grid size constraints on RF front-end passive electronics. These prevent existing ferrite isolators from meeting the bandwidth frequency, and transmit/receive isolation requirements. The circuit 200 overcomes these and other limitations via full duplexing configuration based on a differential distributed amplifier configuration as shown in FIGS. 1 and 2. Each differential cell (gm) 232-235 provides receiving signal amplification while suppressing transmitter (Tx) power leakage at the receiver terminal 220. Both single-ended inputs Rx and Tx signals are excited in differential (or odd) and in-phase (or even) modes, respectively. Due to the common mode rejection at the input of each differential gain stage 232-235, the transmit pair propagates along the gate lines (e.g., gate inputs to differential amplifiers) to the output without being amplified, while the Rx signal is coupled into differential pairs, amplified and added in-phase along the drain lines (e.g., drain outputs of differential amplifiers) toward the output. The different mode excitations thus separate Rx signals from Tx signals.

In addition to the different mode excitations, a cascode configuration is adopted for each gain cell 232-235 to provide improved isolation between input and output. Low noise amplification and broadband mixing can be provided as will be illustrated in FIG. 3. Distributed amplifiers are known for outstanding gain-bandwidth products. Thus, the differential topology, commonly used for transducers in fiber communications for its low noise and high dynamic range, provides common mode noise rejection, thus exhibiting suitable wideband, low noise performance. This circuit 200 can also serve as an N-stage distributed drain-pumped mixer by injection of a local oscillator (LO) at one of the drain termination ports of the amplifiers 232-235. Various LC networks (not shown) realized by microstrip lines and the parasitic capacitances of the transistors filter and improve the LO-RF/RF-LO isolation. The differential topology and the cascode pairs of the circuit 232-235 improve Rx signal linearity, as well as the dynamic range. Power Efficiency can be improved as the half-power Tx output can be used to drive an adjacent distributed amplifier cell (See e.g., FIGS. 4 and 5).

Figure 3:
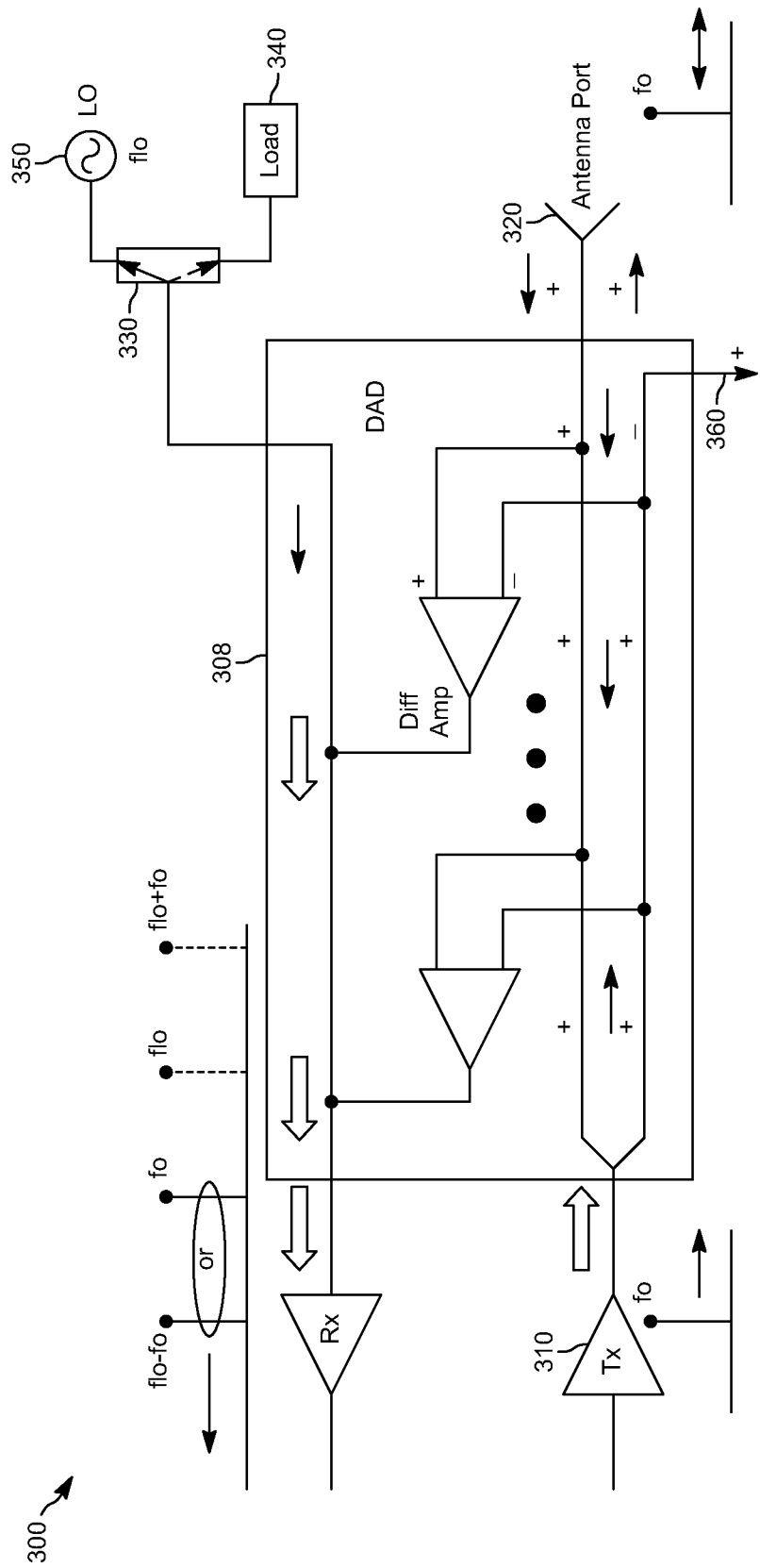
FIG. 3 illustrates an example a mixer circuit that provides concurrent full duplex operations via in-circuit active isolation between a transmitter and a receiver.

FIG. 3 illustrates an example a mixer circuit 300 that provides concurrent full duplex operations via in-circuit active isolation between a transmitter and a receiver. In this example, a distrusted amplifier duplexer (DAD) 308 is shown have two differential amplifiers. A transmitter 310 drives a ½ Tx power output signal on transmission lines 312 and 314 to antenna 320. Signal driven by the transmitter 310 and received by the antenna 320 is referred to as the fundamental frequency (Fo). The transmitted Fo can be phased one hundred and eighty degrees out of phase from the received Fo to mitigate interaction between transmitted and received signals. A switch 330 can be placed at the output of the DAD 308. In one switch setting, the amplified received output signal of the DAD 308 can be terminated at load 340.

In another switch setting, the received output can be also mixed with a local oscillator 350 having a frequency output shown as Flo. In one example, a down-conversion can be performed where Flo subtracts from the received fundamental frequency Fo to provide an intermediate frequency lower than the fundamental. In another example, an up-conversion can be performed where Flo adds to the received fundamental frequency Fo to provide an intermediate frequency higher than the fundamental. Thus, upper and lower sideband operations can be provided via the circuit 300. As shown, one half power output from DAD 308 can be provided at 360 which can be supplied to subsequent stages (See e.g., FIGS. 4 and 5 for cascaded stages).

FIG. 4 illustrates an example a circuit 400 having multiple distributed amplifier stages that provides concurrent full duplex operations via in-circuit active isolation between a transmitter and a receiver. Amplifier stages are shown as distributed amplifier duplexers (DAD) 410 through 430. As shown, one half the output power (½ TX VO from line 2 in FIG. 1) is provided to a subsequent stage. In this example, each DAD 410 through 430 drives a separate transmit/receive antenna 440 through 460, respectively. Various phase adjustment capacitors 470, 474, 480, and 484 can be located at the output of the respective DAD's 410 through 430 to provide signal phase adjustment at each respective stage.

Figure 5:
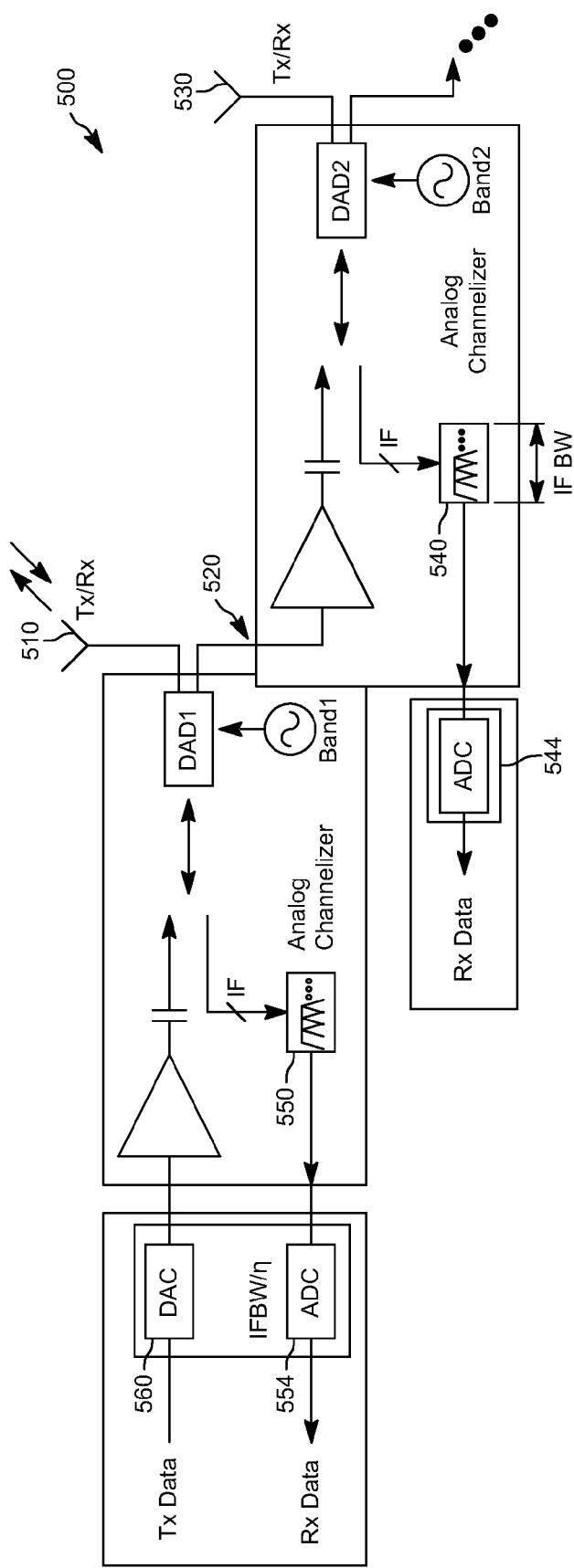
FIG. 5 illustrates an example a circuit having distributed amplifier stages that provides concurrent full duplex operations where each distributed stage is driven with a separate local oscillator for mixing.

FIG. 5 illustrates an example a circuit 500 having two distributed amplifier stages that provides concurrent full duplex operations where each distributed stage is driven with a separate local oscillator for mixing. In this example distributed amplifier duplexer 1 (DAD 1) and distributed amplifier duplexer (DAD 2) have their respective receiving paths mixed via local oscillators shown as band 1 and band 2 representing different (or similar) mixing frequencies. Output of DAD 1 drives its own TX/RX antenna and provides ½ signal power output at 520 to drive DAD 2 which operates its own antenna 530. Received signal from DAD 2 can be processed via analog channelizer 540 (intermediate bandwidth processing circuit) and digitized via analog to digital converter (ADC) 544. Similarly, received signal from DAD 1 can be processed via analog channelizer 550 and digitized via ADC 554. A digital to analog converter (DAC) 560 can be employed to generate outgoing transmission data for the circuit 500.

Figure 6:
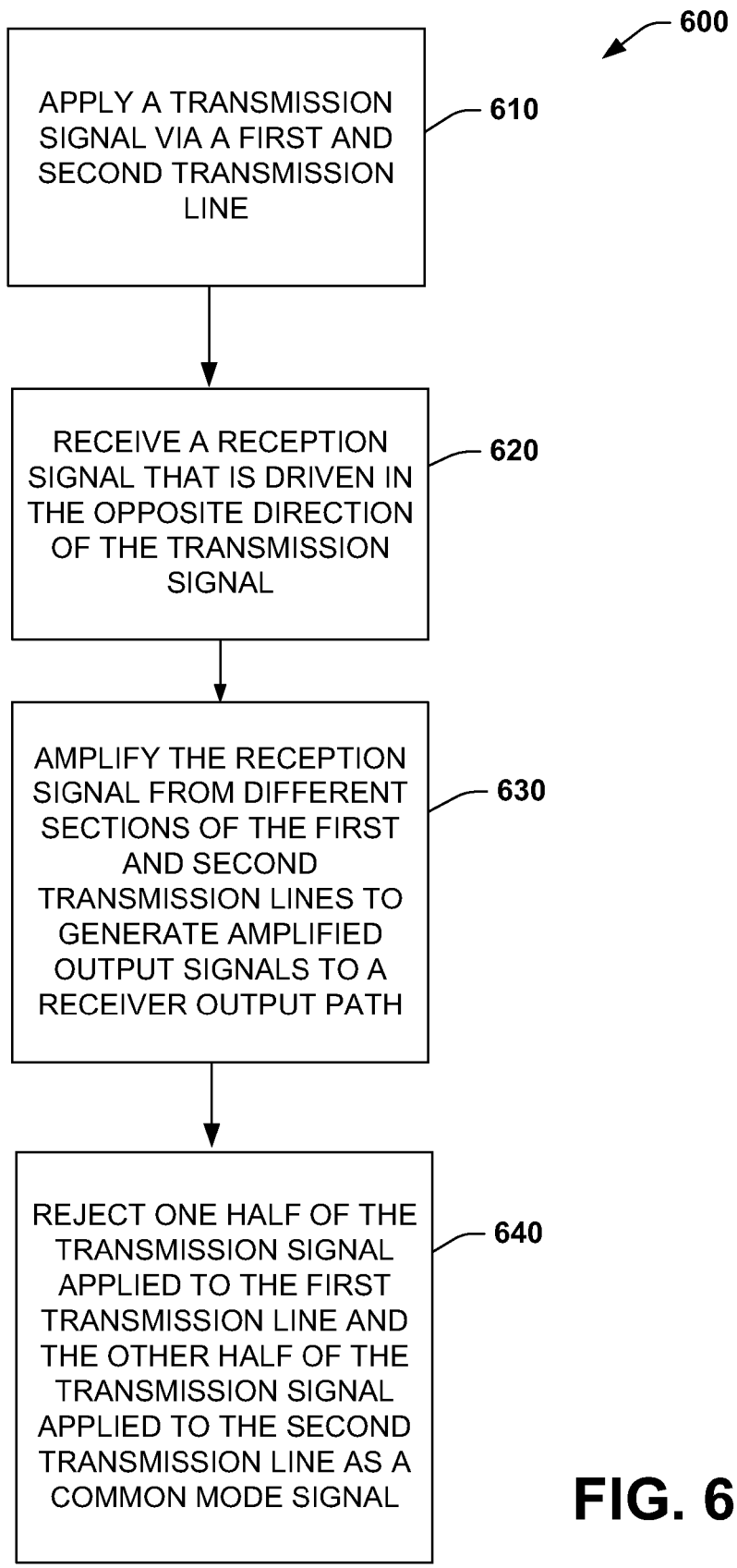
FIG. 6 illustrates an example of a method that provides concurrent full duplex operations via in-circuit active isolation between a transmitter and a receiver.

In view of the foregoing structural and functional features described above, an example method will be better appreciated with reference to FIG. 6. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an IC or a controller, for example.

FIG. 6 illustrates an example of a method 600 that provides concurrent full duplex operations via in-circuit active isolation between a transmitter and a receiver. At 610, the method 600 includes applying a transmission signal via a first and second transmission line (e.g., via transmitter 110 of FIG. 1). One half of the transmission signal is applied to the first transmission line and the other half of the transmission signal is applied to the second transmission line. At 620, the method 600 includes receiving a reception signal that is driven in the opposite direction of the transmission signal on the first and second transmission lines (e.g., via differential amplifiers 1-N of FIG. 1). At 630, the method 600 includes amplifying the reception signal from different sections of the first and second transmission lines to generate amplified output signals to a receiver output path having a first and second receiver transmission line (e.g., via differential amplifiers 1-N of FIG. 1). At 640, the method 600 includes rejecting the one half of the transmission signal applied to the first transmission line and the other half of the transmission signal applied to the second transmission line as a common mode signal to mitigate transmission signal interference with the reception signal (e.g., via differential amplifiers 1-N of FIG. 1).

Although not shown, the method 600 can also include switching a load impedance to the first and second receiver transmission lines or applying a local oscillator signal to the first and second receiver transmission lines. The method 600 can include mixing the local oscillator signal with the amplified output signals on the first and second receiver transmission lines to provide a down conversion signal that comprises the fundamental frequency of the reception signal minus the frequency of the local oscillator signal. In another example, the method 600 can include mixing the local oscillator signal with the amplified output signals on the first and second receiver transmission lines to provide an up conversion signal that comprises the fundamental frequency of the reception signal plus the frequency of the local oscillator signal.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system, comprising:
    a transmitter to drive a transmission signal via a first and second transmission lines, wherein one half of the transmission signal is applied to the first transmission line and the other half of the transmission signal is applied to the second transmission line;
    an antenna that radiates the transmission signal from the transmitter and receives a reception signal, the reception signal is driven in the opposite direction of the transmission signal on the first and second transmission lines; and
    a plurality of differential amplifiers that receive the reception signal from different sections of the first and second transmission lines and generate amplified output signals to a receiver output path having a first and second receiver transmission lines, the differential amplifiers reject the one half of the transmission signal applied to the first transmission line and the other half of the transmission signal applied to the second transmission line as a common mode signal to mitigate transmission signal interference with the reception signal.

2. The system of claim 1, wherein the transmission signal and the reception signal are generated out of phase with respect to each other by about one hundred and eighty degrees.

3. The system of claim 1, wherein at least one of the plurality of differential amplifiers includes a phase adjustment capacitor at its output to adjust the phase of the reception signal.

4. The system of claim 1, further comprising a switch to apply a load impedance to the first and second receiver transmission line or to apply a local oscillator signal to the first and second receiver transmission lines.

5. The system of claim 4, wherein the local oscillator signal is mixed with the amplified output signals on the first and second receiver transmission lines to provide a down conversion signal that comprises the fundamental frequency of the reception signal minus the frequency of the local oscillator signal.

6. The system of claim 4, wherein the local oscillator signal is mixed with the amplified output signals on the first and second receiver transmission lines to provide an up conversion signal that comprises the fundamental frequency of the reception signal plus the frequency of the local oscillator signal.

7. The system of claim 1, further comprising a receiver to process the amplified output signals from the first and second transmission lines of the receiver output path.

8. The system of claim 1, wherein the amplified output signals are provided to at least one other amplifier stage comprising a plurality of differential amplifiers that drive another antenna.

9. The system of claim 8, further comprising a phase adjustment capacitor to adjust the phase of the amplified output signals at the input to the at least one other amplifier stage.

10. The system of claim 8, further comprising at least one other local oscillator signal to mix with the output of the at least one other amplifier stage.

11. A circuit, comprising:
a transmitter to drive a transmission signal via a first and second transmission line, wherein one half of the transmission signal is applied to the first transmission line and the other half of the transmission signal is applied to the second transmission line;
an antenna that radiates the transmission signal from the transmitter and receives a reception signal, the reception signal is driven in the opposite direction of the transmission signal on the first and second transmission lines, wherein the transmission signal and the reception signal are generated out of phase with respect to each other by about one hundred and eighty degrees;
a plurality of differential amplifiers that receive the reception signal from different sections of the first and second transmission lines and generate amplified output signals to a receiver output path having a first and second receiver transmission line, the differential amplifiers reject the one half of the transmission signal applied to the first transmission line and the other half of the transmission signal applied to the second transmission line as a common mode signal to mitigate transmission signal interference with the reception signal; and
a receiver to process the amplified output signals from the first and second transmission lines of the receiver output path.

12. The circuit of claim 11, wherein at least one of the plurality of differential amplifiers includes a phase adjustment capacitor at its output to adjust the phase of the reception signal.

13. The circuit of claim 11, further comprising a switch to apply a load impedance to the first and second receiver transmission line or to apply a local oscillator signal to the first and second receiver transmission lines.

14. The circuit of claim 13, wherein the local oscillator signal is mixed with the amplified output signals on the first and second receiver transmission lines to provide a down conversion signal that comprises the fundamental frequency of the reception signal minus the frequency of the local oscillator signal.

15. The circuit of claim 13, wherein the local oscillator signal is mixed with the amplified output signals on the first and second receiver transmission lines to provide an up conversion signal that comprises the fundamental frequency of the reception signal plus the frequency of the local oscillator signal.

16. A method, comprising:
applying a transmission signal via a first and second transmission lines, wherein one half of the transmission signal is applied to the first transmission line and the other half of the transmission signal is applied to the second transmission line;
receiving a reception signal that is driven in the opposite direction of the transmission signal on the first and second transmission lines;
amplifying the reception signal from different sections of the first and second transmission lines to generate amplified output signals to a receiver output path having a first and second receiver transmission lines; and
rejecting the one half of the transmission signal applied to the first transmission line and the other half of the transmission signal applied to the second transmission line as a common mode signal to mitigate transmission signal interference with the reception signal.

17. The method of claim 16, further comprising adjusting the phase of the reception signal from at least one section of the different sections of the first and second transmission lines.

18. The method of claim 16, further comprising switching a load impedance to the first and second receiver transmission lines or applying a local oscillator signal to the first and second receiver transmission lines.

19. The method of claim 18, further comprising mixing the local oscillator signal with the amplified output signals on the first and second receiver transmission lines to provide a down conversion signal that comprises the fundamental frequency of the reception signal minus the frequency of the local oscillator signal.

20. The method of claim 16, further comprising mixing the local oscillator signal with the amplified output signals on the first and second receiver transmission lines to provide an up conversion signal that comprises the fundamental frequency of the reception signal plus the frequency of the local oscillator signal.

* * * * *